(12) United States Patent
Mathews et al.

(10) Patent No.: US 11,697,353 B2
(45) Date of Patent: Jul. 11, 2023

(54) ELECTRIC VEHICLE CHARGING CONNECTOR

(71) Applicant: Aptiv Technologies Limited, St. Michael (BB)

(72) Inventors: Thomas Mathews, Cortland, OH (US); William C. Lovitz, Niles, OH (US); Mark Fredrickson, Rootstown, OH (US); Ronald A. Puhl, Poland, OH (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 272 days.

(21) Appl. No.: 16/999,776

(22) Filed: Aug. 21, 2020

(65) Prior Publication Data

US 2022/0055490 A1    Feb. 24, 2022

(51) Int. Cl.
| | | |
|---|---|---|
| *B60L 53/16* | (2019.01) | |
| *H01R 13/453* | (2006.01) | |
| *H01R 13/52* | (2006.01) | |
| *B60L 53/18* | (2019.01) | |

(52) U.S. Cl.
CPC ............ *B60L 53/16* (2019.02); *H01R 13/453* (2013.01); *H01R 13/5202* (2013.01); *B60L 53/18* (2019.02)

(58) Field of Classification Search
CPC .............................. B60L 53/16; H01R 13/453
USPC .......................................................... 320/104
See application file for complete search history.

(56) References Cited

U.S. PATENT DOCUMENTS

| 9,277,683 | B2 | 3/2016 | Ionescu et al. | |
|---|---|---|---|---|
| 10,854,999 | B1* | 12/2020 | Price | H01R 4/26 |
| 2014/0043732 | A1* | 2/2014 | McKay | H02G 3/14 |
| | | | | 361/622 |
| 2016/0272077 | A1* | 9/2016 | Erices | B60L 3/0069 |
| 2019/0044267 | A1* | 2/2019 | Lui | H01R 13/665 |
| 2020/0227853 | A1* | 7/2020 | Lyon | H01R 4/56 |
| 2020/0287319 | A1* | 9/2020 | Moriyama | H01R 13/42 |
| 2021/0347270 | A1* | 11/2021 | Cole | B60L 53/16 |
| 2021/0359453 | A1* | 11/2021 | Yamamoto | H01R 13/502 |
| 2022/0332198 | A1* | 10/2022 | Rhodes | B60L 53/16 |

FOREIGN PATENT DOCUMENTS

| EP | 3667831 A1 | 6/2020 |
|---|---|---|
| EP | 3680995 A1 | 7/2020 |
| GB | 2469023 A | 10/2010 |

OTHER PUBLICATIONS

Extended European Search Report for EP Application No. 21190583.1, dated Jan. 19, 2022, 9 pages.

* cited by examiner

*Primary Examiner* — Suchin Parihar
(74) *Attorney, Agent, or Firm* — Billion & Armitage

(57) ABSTRACT

An electrical connector includes a plurality of cylindrical electrical terminals connected to ends of a plurality of first electrical cables, a housing defining a plurality of housing terminal cavities in which the plurality of cylindrical electrical terminals is disposed, and a cover attached to the housing having a plurality of cover cavities that is axially aligned with the plurality of housing terminal cavities. The plurality of cover cavities is configured to receive the plurality of cylindrical electrical terminals as it is inserted within the plurality of housing terminal cavities.

18 Claims, 22 Drawing Sheets

ELECTRIC VEHICLE CHARGING CONNECTOR

TECHNICAL FIELD OF THE INVENTION

The present invention relates generally to electrical connectors and more particularly to electrical connectors used in electric vehicle charging applications.

BACKGROUND

Electric vehicle charging connectors, such as those conforming to Society of Automotive Engineers (SAE) J1772, international Electrotechnical Commission (IEC) 62196, Japan Automobile Research Institute CHAdeMO, or Goubiao/T (GBT) 20234.1 standards, are generally very cumbersome and difficult to assemble. The example shown in FIG. 1 involved processing many separate wire leads, terminals, seals, retainers, and fasteners, thereby leading to complex assembly. Additionally, this electric vehicle charging connector was not designed and built to be serviceable.

SUMMARY

Given the high number of mating/unmating cycles that electric vehicle charging connectors experience during their service life, inventors recognized a need to make an electric vehicle charging connectors that is serviceable and/or has contacts and terminals that are replaceable.

According to one or more aspects of the present disclosure, an electrical connector includes a plurality of cylindrical electrical terminals connected to ends of a plurality of first electrical cables, a housing defining a plurality of housing terminal cavities in which the plurality of cylindrical electrical terminals is disposed, and a cover attached to the housing having a plurality of cover cavities that is axially aligned with the plurality of housing terminal cavities, the plurality of cover cavities configured to receive the plurality of cylindrical electrical terminals as it is inserted within the plurality of housing terminal cavities.

In one or more embodiments of the electrical connector according to the previous paragraph, the electrical connector may further include a plurality of terminal retainers surrounding the plurality of first electrical cables configured to cooperate with the plurality of cover cavities to hold the plurality of cylindrical electrical terminals within the plurality of housing terminal cavities.

In one or more embodiments of the electrical connector according to any one of the previous paragraphs, the electrical connector may further include a plurality of first cable seals surrounding the plurality of first electrical cables configured to provide an environmental seal between the plurality of first electrical cables, the plurality of terminal retainers, and inner walls of the plurality of cover cavities.

In one or more embodiments of the electrical connector according to any one of the previous paragraphs, the electrical connector may further include a yoke configured to separate the plurality of first electrical cables and configured to secure the plurality of terminal retainers within the plurality of cover cavities.

In one or more embodiments of the electrical connector according to any one of the previous paragraphs, the cover may define a plurality of cover terminal cavities configured to receive a plurality of planar electrical terminals attached to a plurality of second electrical cables. The plurality of planar electrical terminals may be attached to a plurality of conductive members disposed within the cover via a plurality of threaded fasteners.

In one or more embodiments of the electrical connector according to any one of the previous paragraphs, one planar electrical terminal of the plurality of planar electrical terminals may be laterally and longitudinally offset from another planar electrical terminal of the plurality of planar electrical terminals.

In one or more embodiments of the electrical connector according to any one of the previous paragraphs, the cover may define an access portal located, sized, and arranged to allow tool access to the plurality of threaded fasteners.

In one or more embodiments of the electrical connector according to any one of the previous paragraphs, the electrical connector may further include a plurality of second cable seals surrounding the plurality of second electrical cables configured to provide an environmental seal between the plurality of second electrical cables and inner walls of the plurality of cover terminal cavities.

In one or more embodiments of the electrical connector according to any one of the previous paragraphs, the electrical connector may further include a plurality of second cable retainers configured to hold the plurality of second cable seals within the plurality of cover terminal cavities.

In one or more embodiments of the electrical connector according to any one of the previous paragraphs, the electrical connector may further include a removeable access plug configured to seal the access portal.

In one or more embodiments of the electrical connector according to any one of the previous paragraphs, the cover may be configured to dress the plurality of first electrical cables and the plurality of second electrical cables in a rightward direction, in a leftward direction, or in a downward direction.

In one or more embodiments of the electrical connector according to any one of the previous paragraphs, the housing may include a printed circuit board assembly defining a plurality of circuit board apertures through which the plurality of cylindrical electrical terminals extends.

In one or more embodiments of the electrical connector according to any one of the previous paragraphs, the printed circuit board assembly may include a connector header and wherein the connector header is sealed to the cover.

According to one or more aspects of the present disclosure, a method of assembling an electrical connector includes inserting a plurality of cylindrical electrical terminals connected to ends of a plurality of first electrical cables into plurality of housing terminal cavities of a connector device having a housing defining the plurality of housing terminal cavities and a cover attached to the housing having a plurality of cover cavities that is axially aligned with the plurality of housing terminal cavities, wherein the plurality of cover cavities receive the plurality of cylindrical electrical terminals as it is inserted within the plurality of housing terminal cavities.

In one or more embodiments of the method according to the previous paragraph, the method may also include attaching a plurality of terminal retainers to the plurality of first electrical cables, wherein the plurality of first electrical cables cooperates with the plurality of cover cavities to hold the plurality of cylindrical electrical terminals within the plurality of housing terminal cavities.

In one or more embodiments of the method according to any one the previous paragraphs, the method may also include inserting a plurality of planar electrical terminals attached to a plurality of second electrical cables within a plurality of cover terminal cavities defined by the cover and attaching plurality of planar electrical terminals to a plurality of conductive members disposed within the cover via a plurality of threaded fasteners.

In one or more embodiments of the method according to any one the previous paragraphs, the method may also include laterally and longitudinally offsetting one planar electrical terminal of the plurality of planar electrical terminals is from another planar electrical terminal of the plurality of planar electrical terminals.

In one or more embodiments of the method according to any one the previous paragraphs, the method may also include inserting a removeable access plug into an access portal located, sized, and arranged to allow tool access to the plurality of threaded fasteners.

In one or more embodiments of the method according to any one the previous paragraphs, the method may also include inserting the plurality of cylindrical electrical terminals through a plurality of circuit board apertures defined by a printed circuit board assembly disposed within the housing.

DETAILED DESCRIPTION

An example of an electrical connector, such as an electric vehicle charging connector, is presented in FIGS. 2 through 21. The electrical connector is used to interconnect three alternating current (AC) electrical cables and two higher power direct current (DC) electrical cables, such as those used in the SAE J1772 Combined Charging System (CCS).

Figure 6:
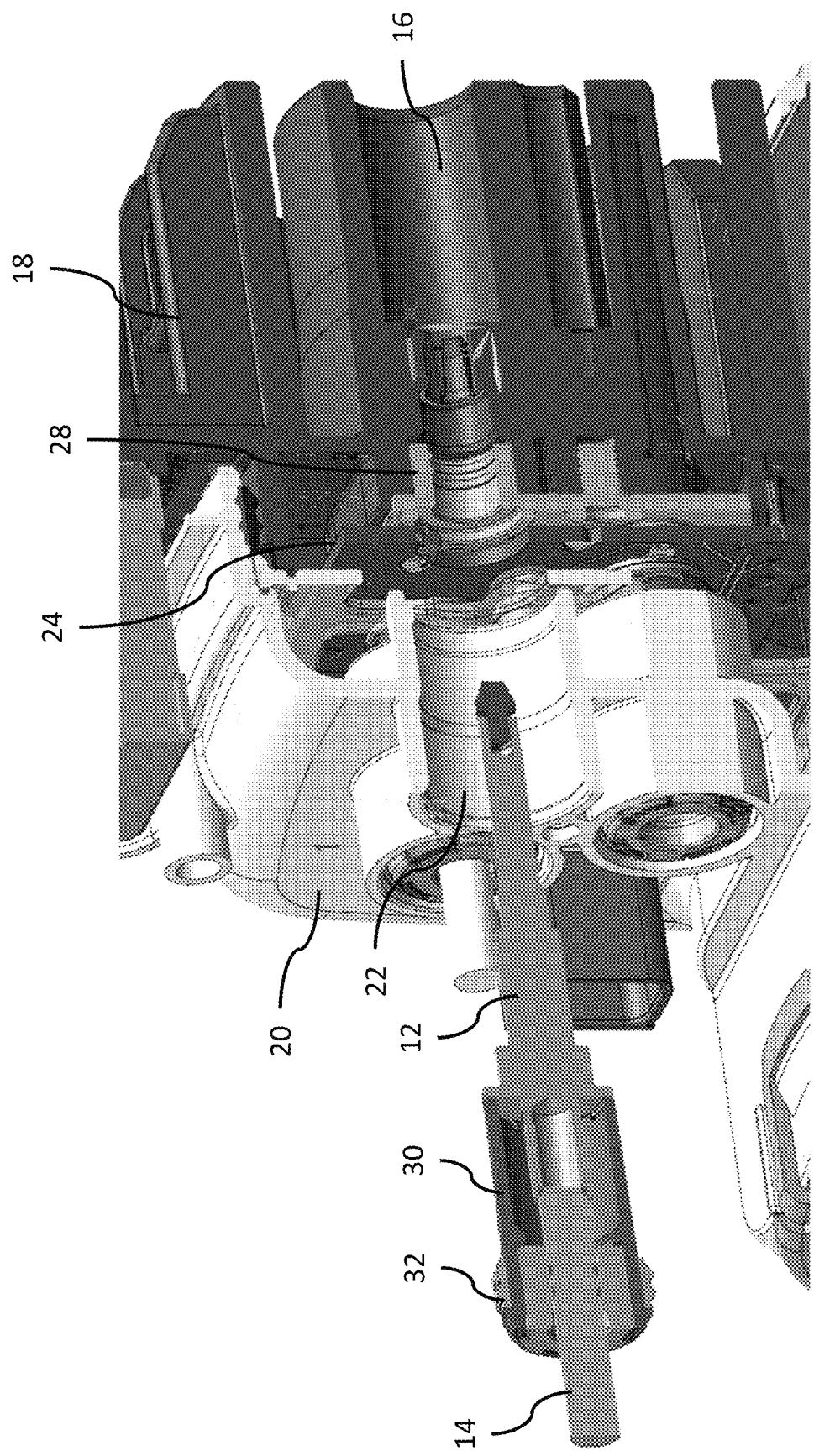
FIG. 6 is an exploded cross section view of the electric vehicle charging connector of FIG. 1 according to some embodiments.
Figure 7:
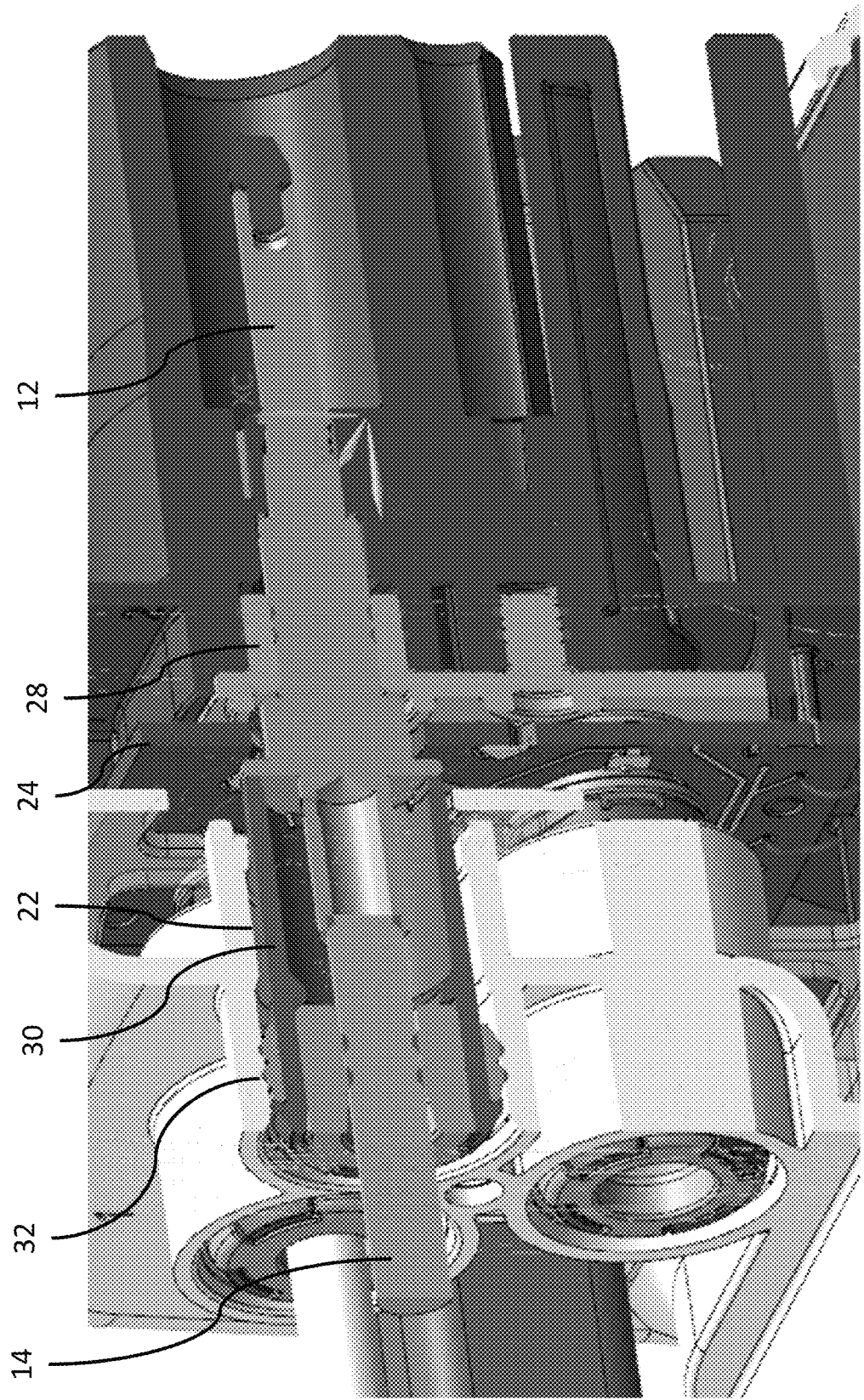
FIG. 7 is a cross section view of the electric vehicle charging connector of FIG. 6 according to some embodiments.
Figure 8:
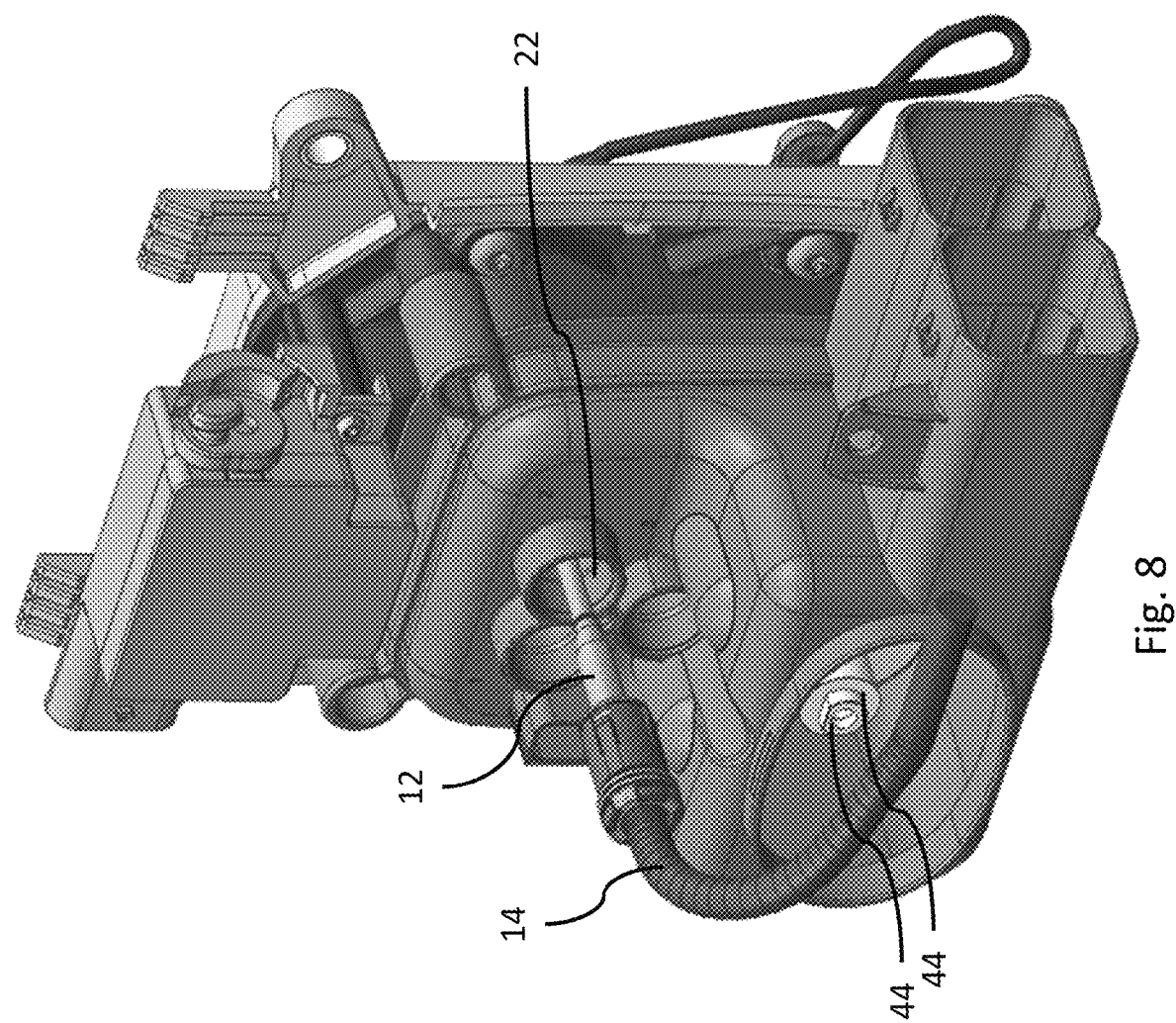
FIG. 8 is another exploded view of the electric vehicle charging connector of FIG. 1 according to some embodiments.
Figure 9:
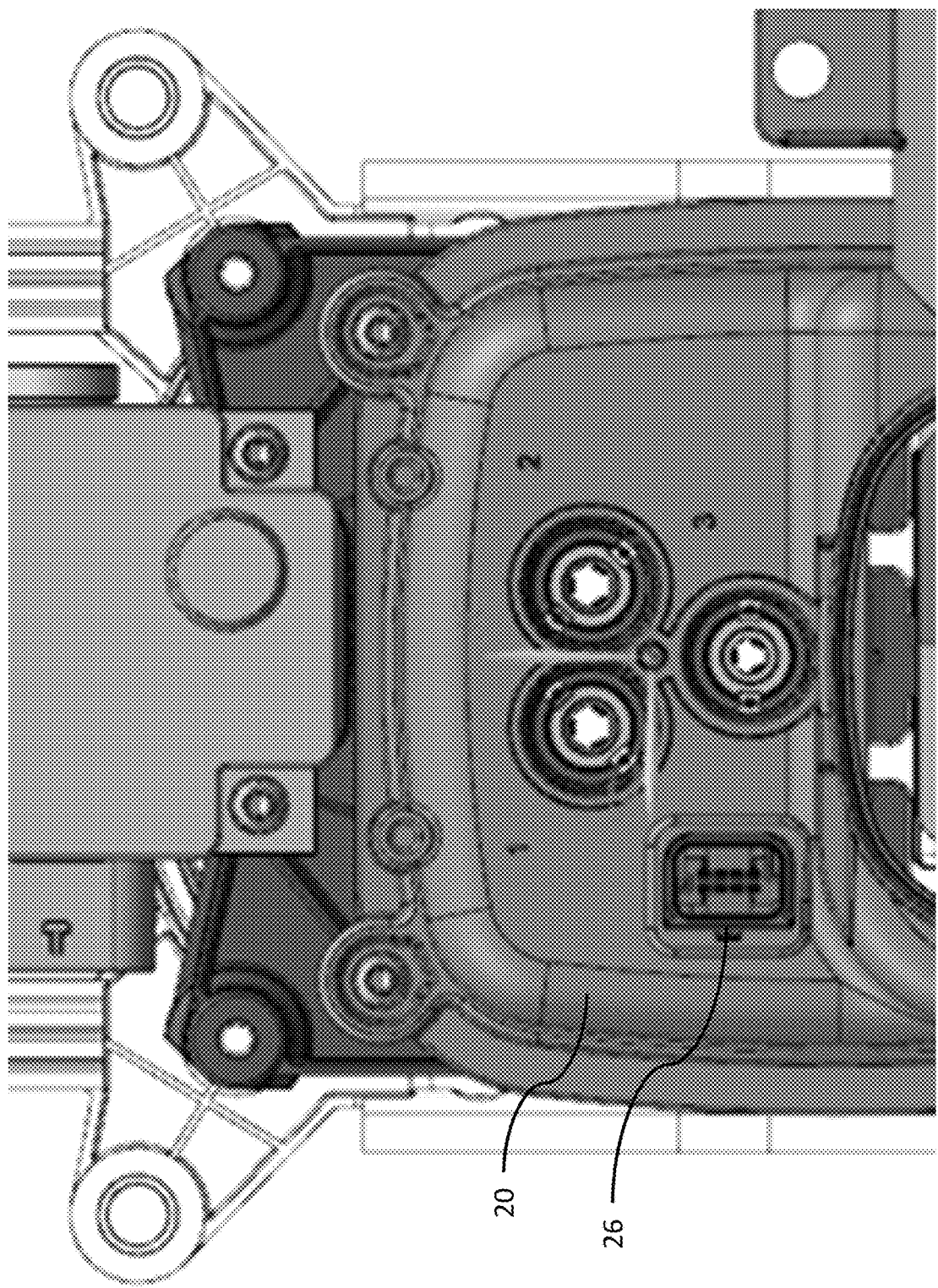
FIG. 9 is a partial front view of the electric vehicle charging connector of FIG. 1 according to some embodiments.

The electrical connector 10 includes a plurality of cylindrical AC electrical terminals 12 that are connected to ends of the AC electrical cables 14. When assembled, the AC terminals 12 are disposed within AC terminal cavities 16 defined by a dielectric housing 18 of the electrical connector 10. A dielectric cover 20 is attached to the housing 18. The cover 20 has a plurality of cover cavities 22 that are axially aligned with the AC terminal cavities 16 and extend through the cover 20. The cover cavities 22 are configured to receive the AC terminals 12 as they are inserted within the AC terminal cavities 16 as shown in FIGS. 6 and 7. The electrical connector 10 further includes a printed circuit board (PCB) assembly 24, best shown in FIG. 15, within the housing 18. The PCB assembly 24 defines circuit board apertures through which the AC terminals 12 extend. The PCB assembly 24 includes a connector header 26 that is sealed to the cover 20.

The electrical connector 10 also includes a compliant terminal seal 28 that provides an environmental seal between the AC terminals 12 and the cover 20. The terminal seal 28 is located between the housing 18 and the cover 20. Dielectric terminal retainers 30 surrounding the AC electrical cables 14 cooperate with the cover cavities 22 to hold the AC terminals 12 within the AC terminal cavities 16. AC cable seals 32 surrounding the AC electrical cables 14 are configured to provide an environmental seal between the AC electrical cables 14, the terminal retainers 30, and inner walls of the cover cavities 22. A dielectric yoke 36 is fastened to the cover 20 by a screw or another fastener and is configured to separate the AC electrical cables 14 and to secure the terminal retainers 30 within the cover cavities 22.

Figure 10:
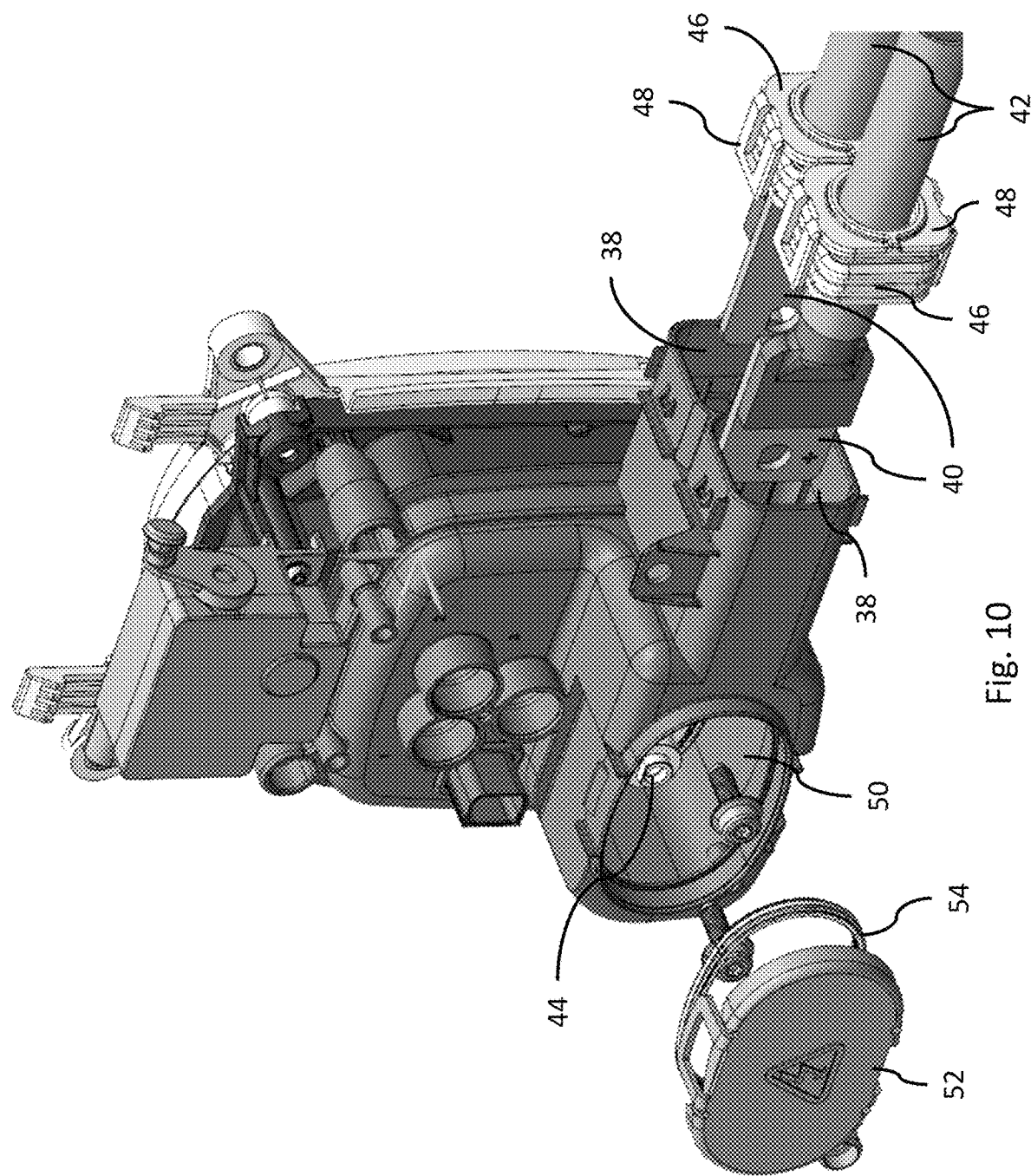
FIG. 10 is yet another exploded view of the electric vehicle charging connector of FIG. 1 according to some embodiments.
Figure 12:
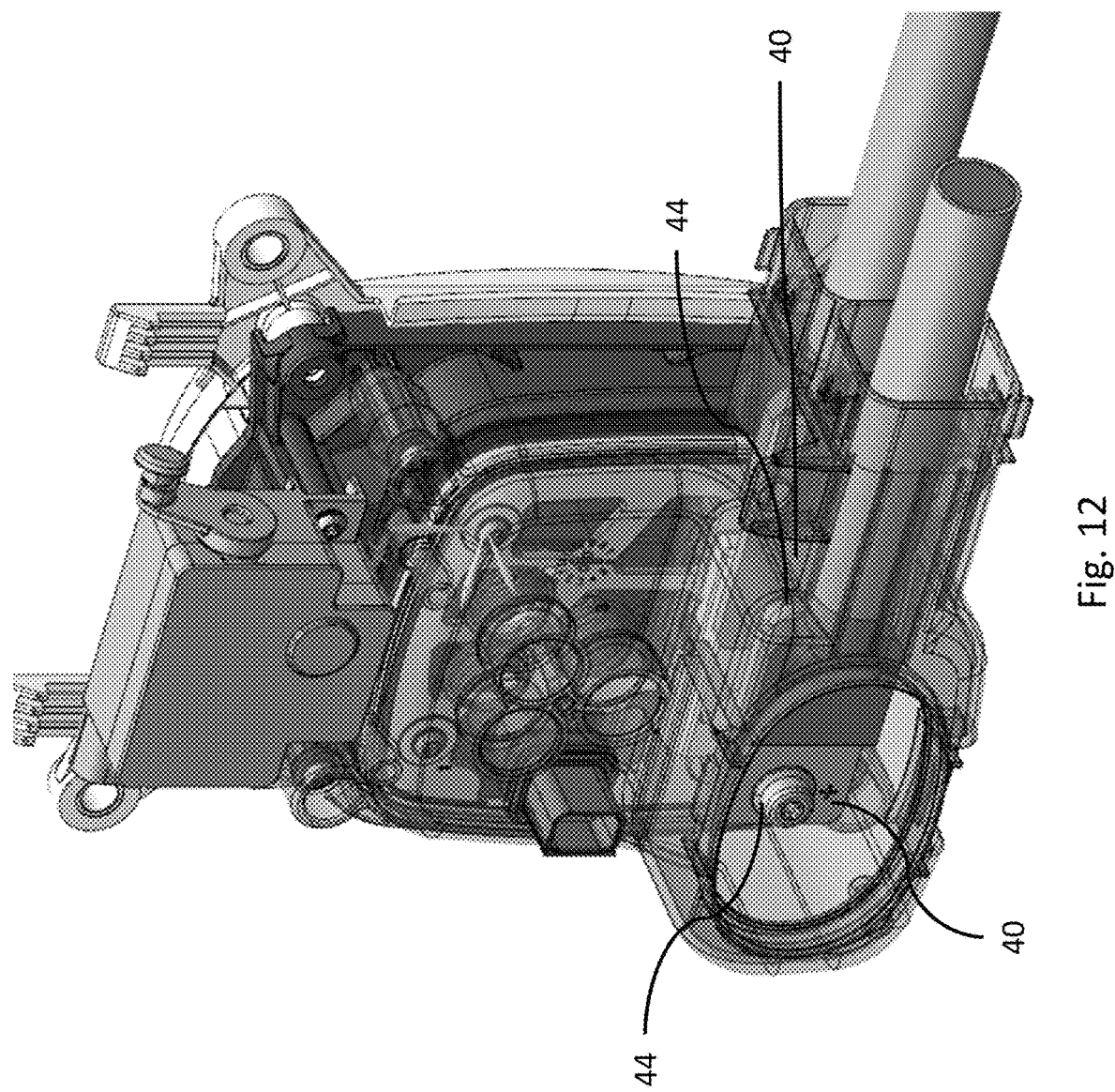
FIG. 12 is an X-ray assembled view of the electric vehicle charging connector of FIG. 10 according to some embodiments.
Figure 13:
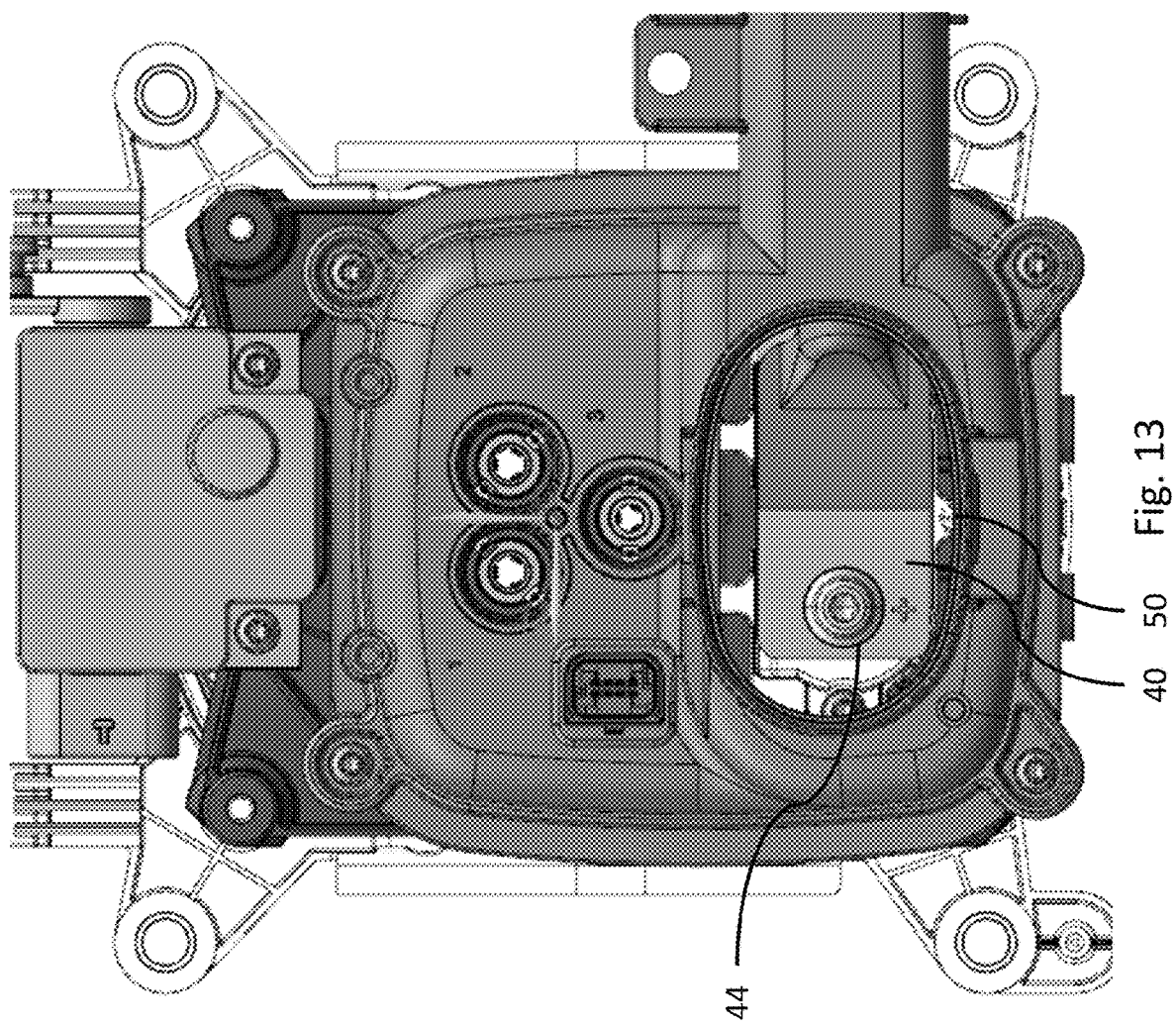
FIG. 13 is a front view of the electric vehicle charging connector of FIG. 12 according to some embodiments.
Figure 14:
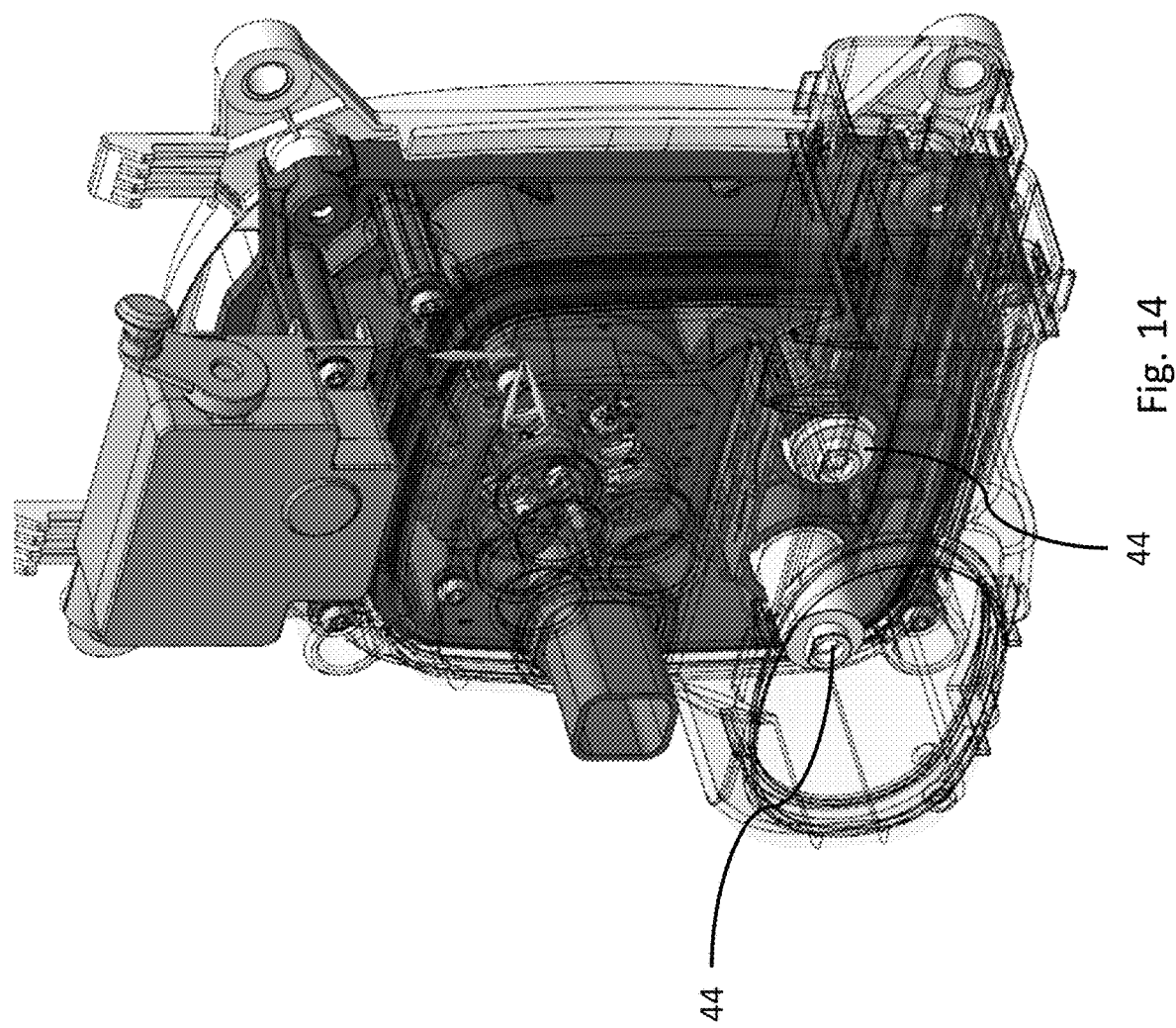
FIG. 14 is an X-ray view of the electric vehicle charging connector of FIG. 1 according to some embodiments.
Figure 15:
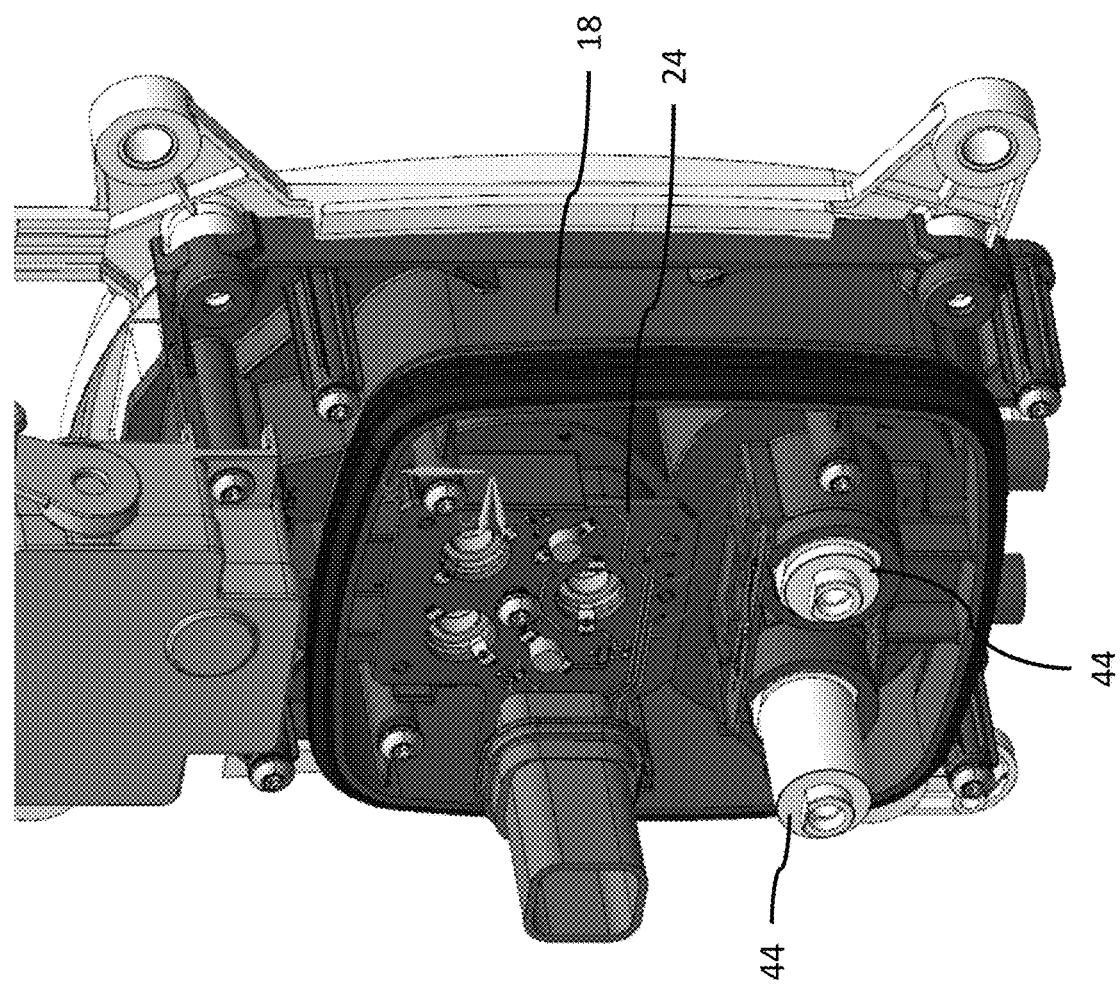
FIG. 15 is a partially disassembled view of the electric vehicle charging connector of FIG. 1 according to some embodiments.
Figure 16:
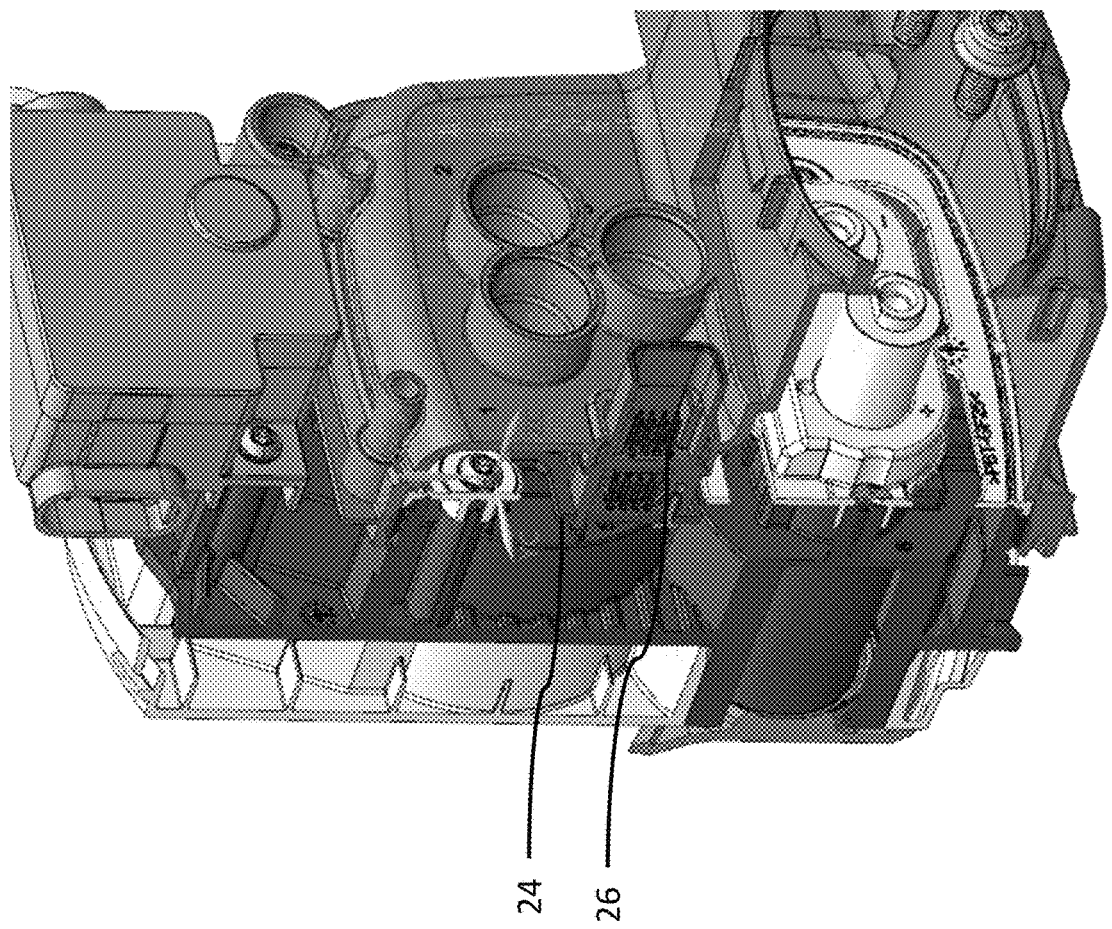
FIG. 16 is a cross section view of the electric vehicle charging connector of FIG. 1 according to some embodiments.
Figure 17:
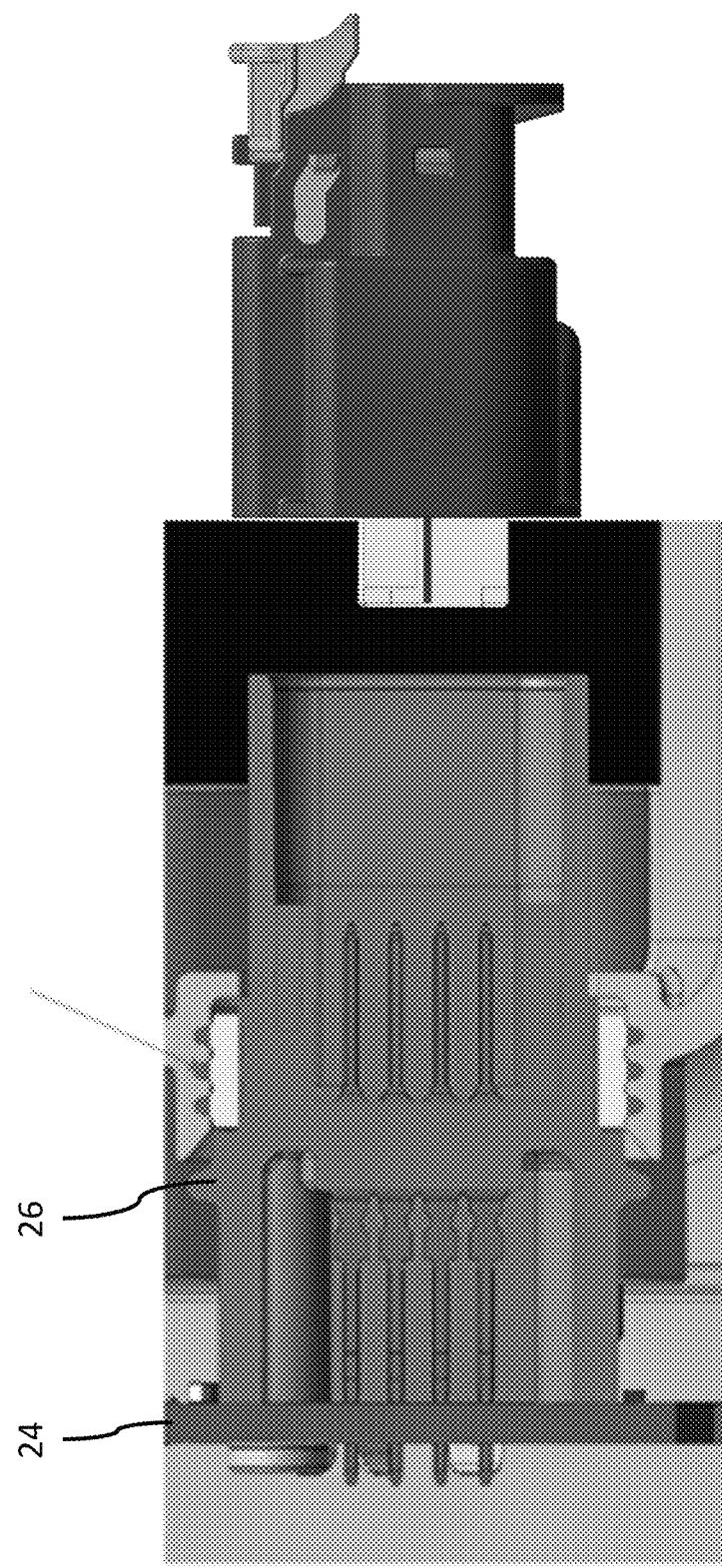
FIG. 17 is cross section view of a connector header of the electric vehicle charging connector of FIG. 1 according to some embodiments.

The cover 20 also defines a plurality of cover terminal cavities 38, see FIG. 10, that are configured to receive a pair of planar DC electrical terminals 40 or bus bars that are attached to DC electrical cables 42 that are sized to carry more electrical power than the AC electrical cables 14. The planar DC terminals 40 are attached to a pair of conductive members forming cylindrical DC electrical terminals 44, best shown in FIG. 15, that are disposed within the housing 18. The planar DC terminals 40 are attached to the cylindrical DC terminals 44 by threaded fasteners, e.g. hex head, or socket head bolts. Holes in the planar DC electrical terminals 40 may be keyed to the cylindrical DC terminals 44 to assure proper alignment between the planar DC electrical terminals 40 and the cylindrical DC terminals 44, as shown in FIG. 10. As best shown in FIG. 12, the cylindrical DC terminals 44 are located, sized, and arranged so that one of the planar DC terminals 40 is laterally and longitudinally offset from the other planar DC electrical terminal 40. The electrical connector 10 includes a pair of DC cable seals 46, shown in FIG. 10, surrounding the DC electrical cables 42 that are configured to provide an environmental seal between the DC electrical cables 42 and inner walls of the cover terminal cavities 38. The cover 20 has a pair of DC cable retainers 48 that are configured to hold the DC cable seals 46 within the cover terminal cavities 38.

The cover 20 defines an access portal 50 that is located, sized, and arranged to allow access for a tool, such as a screwdriver, to the threaded fasteners. A removeable access plug 52 having an access seal 54 is used to cover and seal the access portal 50.

Figure 18:
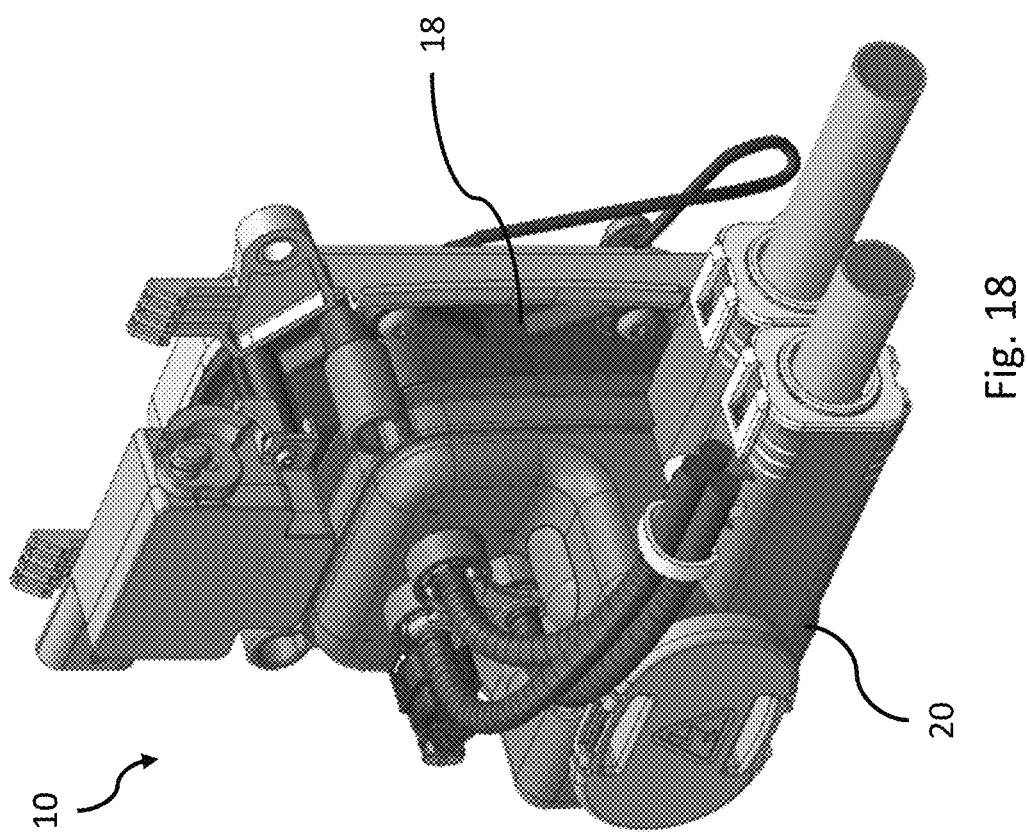
FIG. 18 is perspective view of an electric vehicle charging connector with the cables dressed in a rightward direction according to some embodiments.
Figure 19:
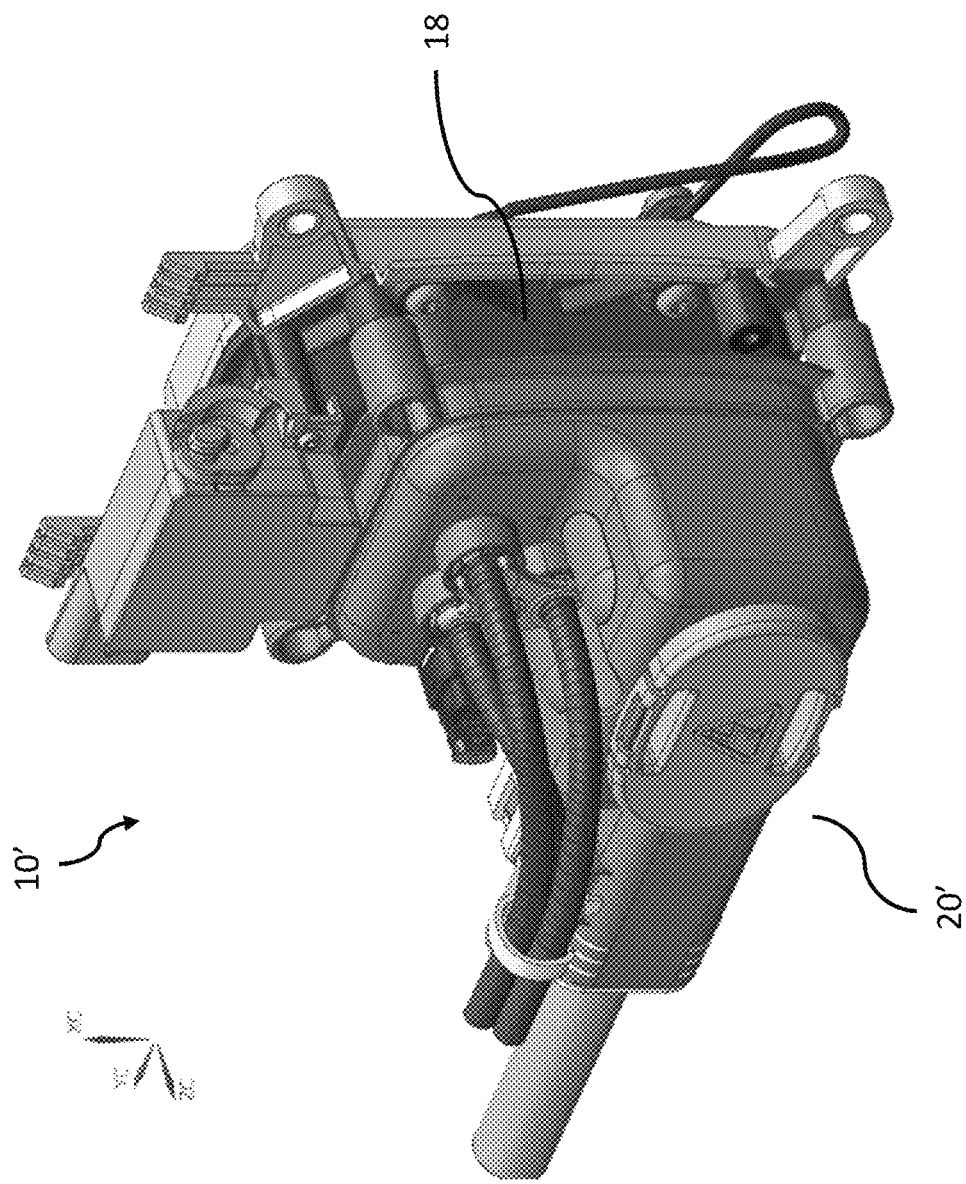
FIG. 19 is perspective view of an electric vehicle charging connector with the cables dressed in a leftward direction according to some embodiments.
Figure 20:
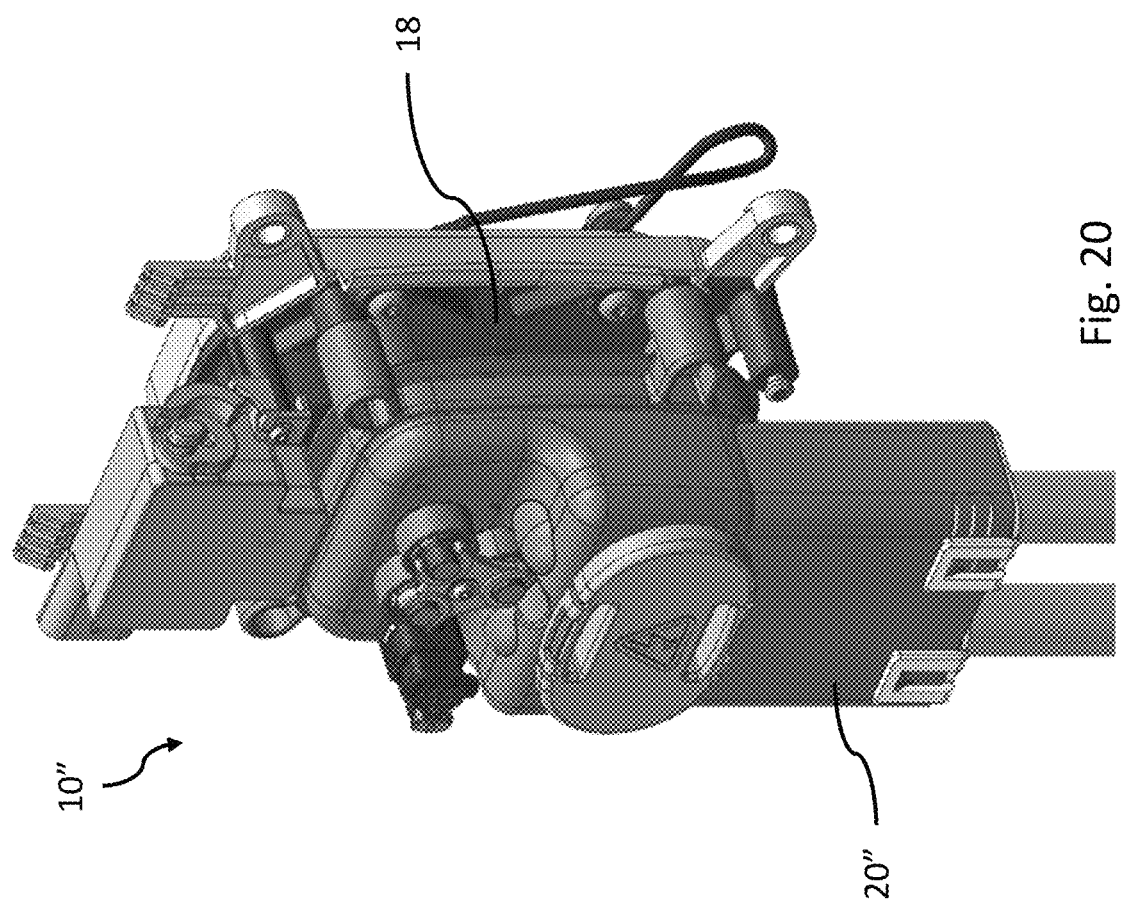
FIG. 20 is perspective view of an electric vehicle charging connector with the cables dressed in a downward direction according to some embodiments.
Figure 21:
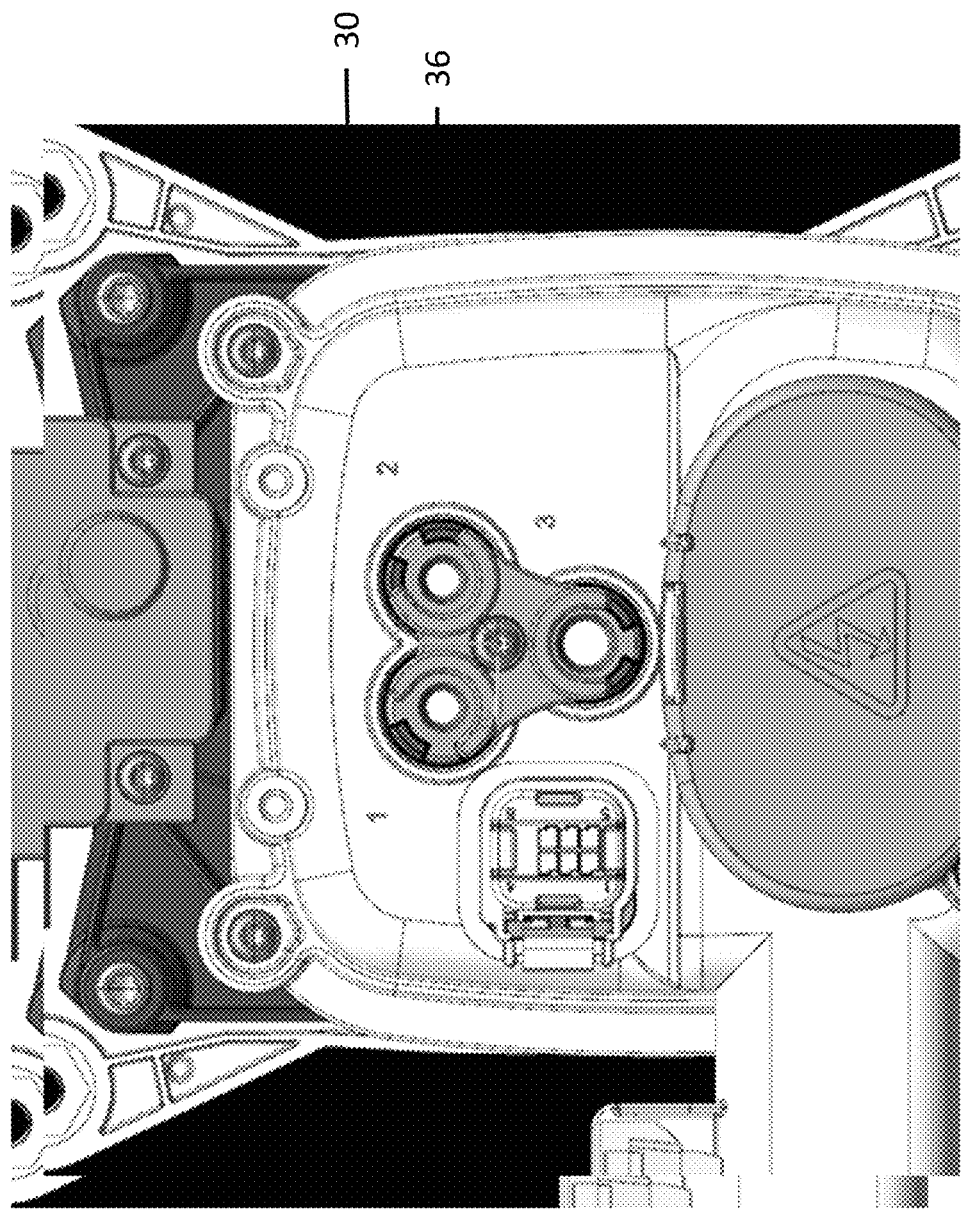
FIG. 21 is a front view of the is a front view of the electric vehicle charging connector of FIG. 18 according to some embodiments.

The cover may be configured to dress the plurality of first electrical cables and the plurality of second electrical cables in a rightward direction 20, in a leftward direction 20', or in a downward direction 20" as shown in FIGS. 18-20.

Figure 1:
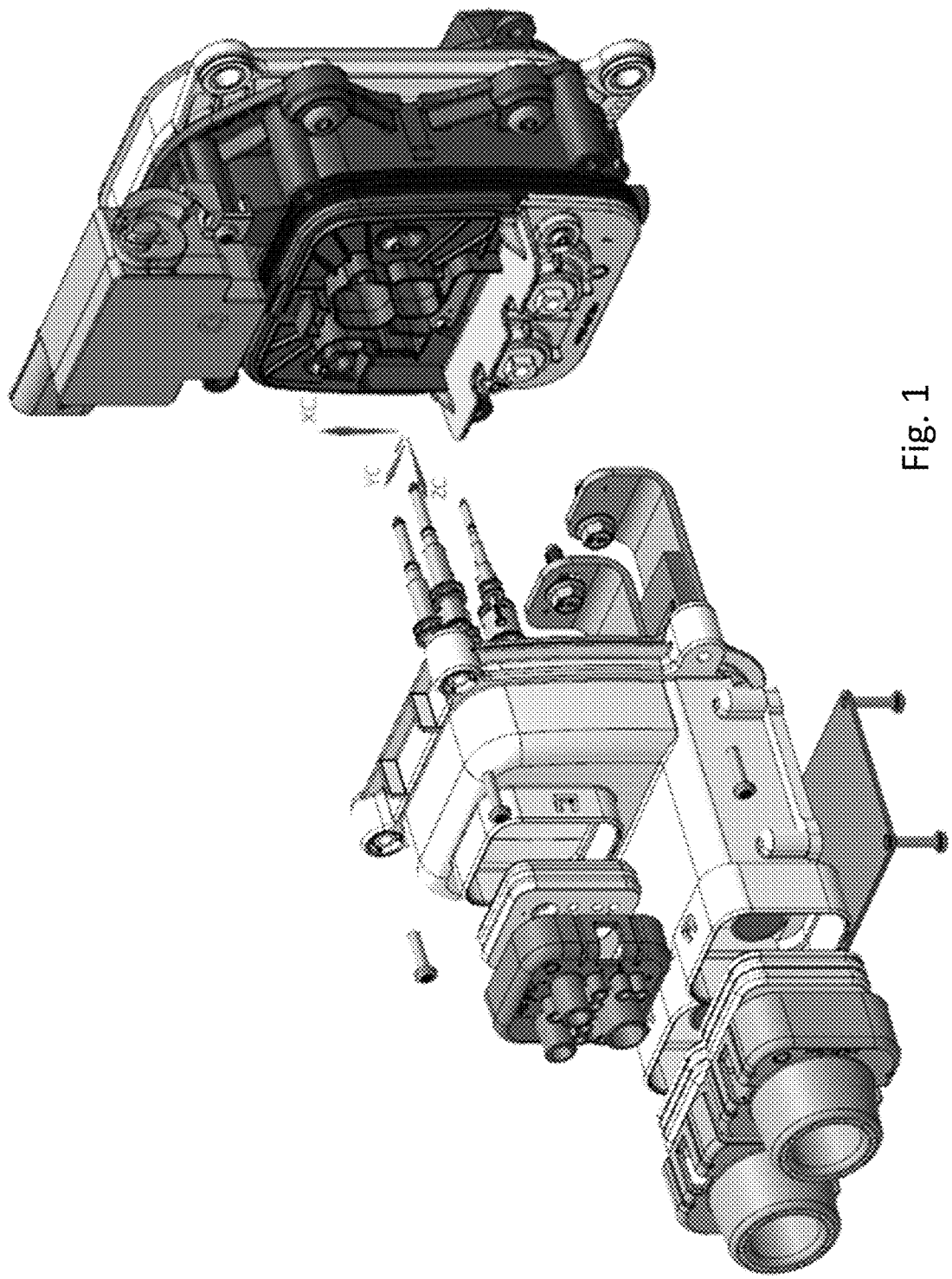
FIG. 1 is an exploded perspective view of an electric vehicle charging connector according to the prior art.
Figure 2:
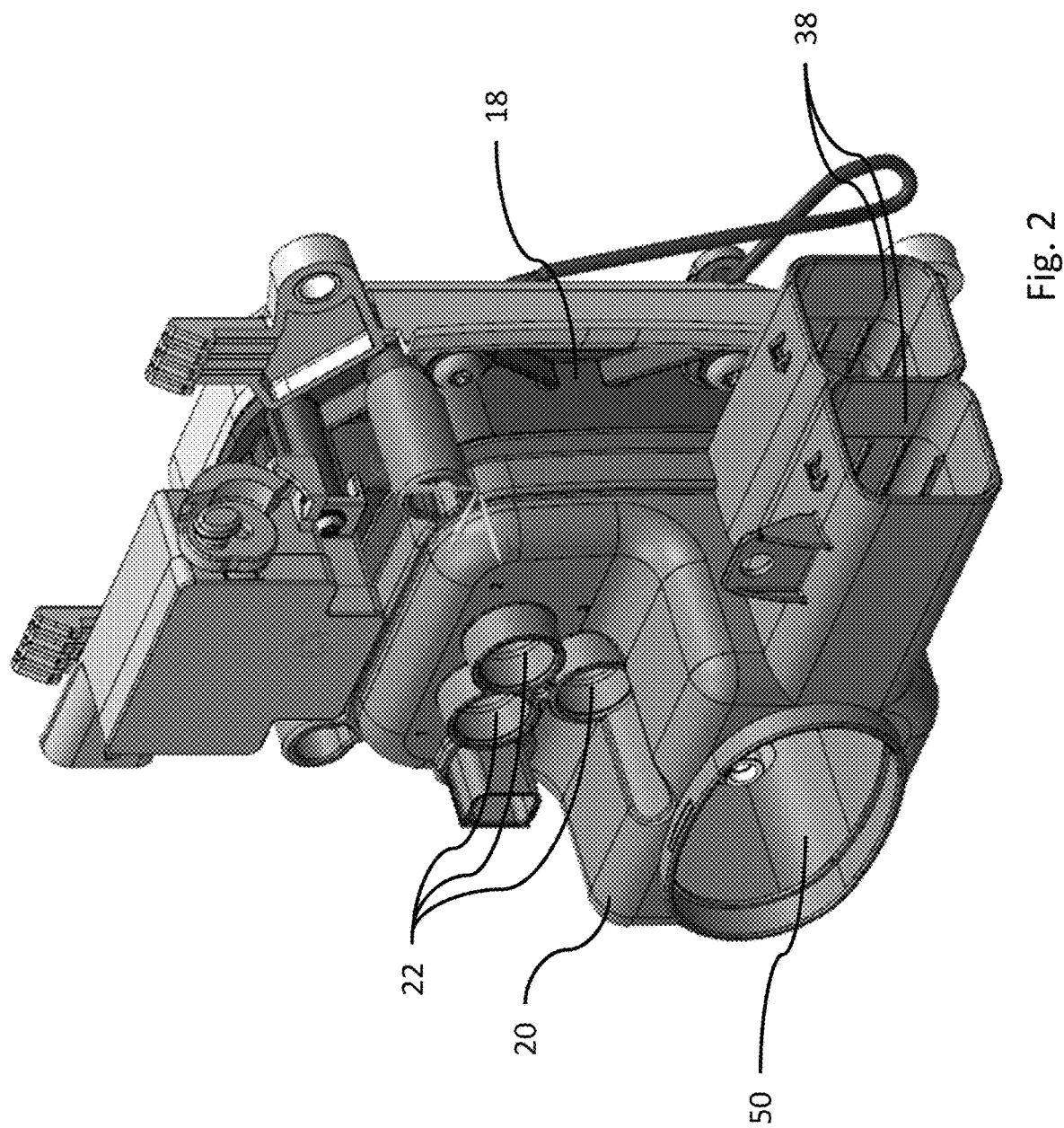
FIG. 2 is a perspective view an electric vehicle charging connector according to some embodiments.
Figure 3:
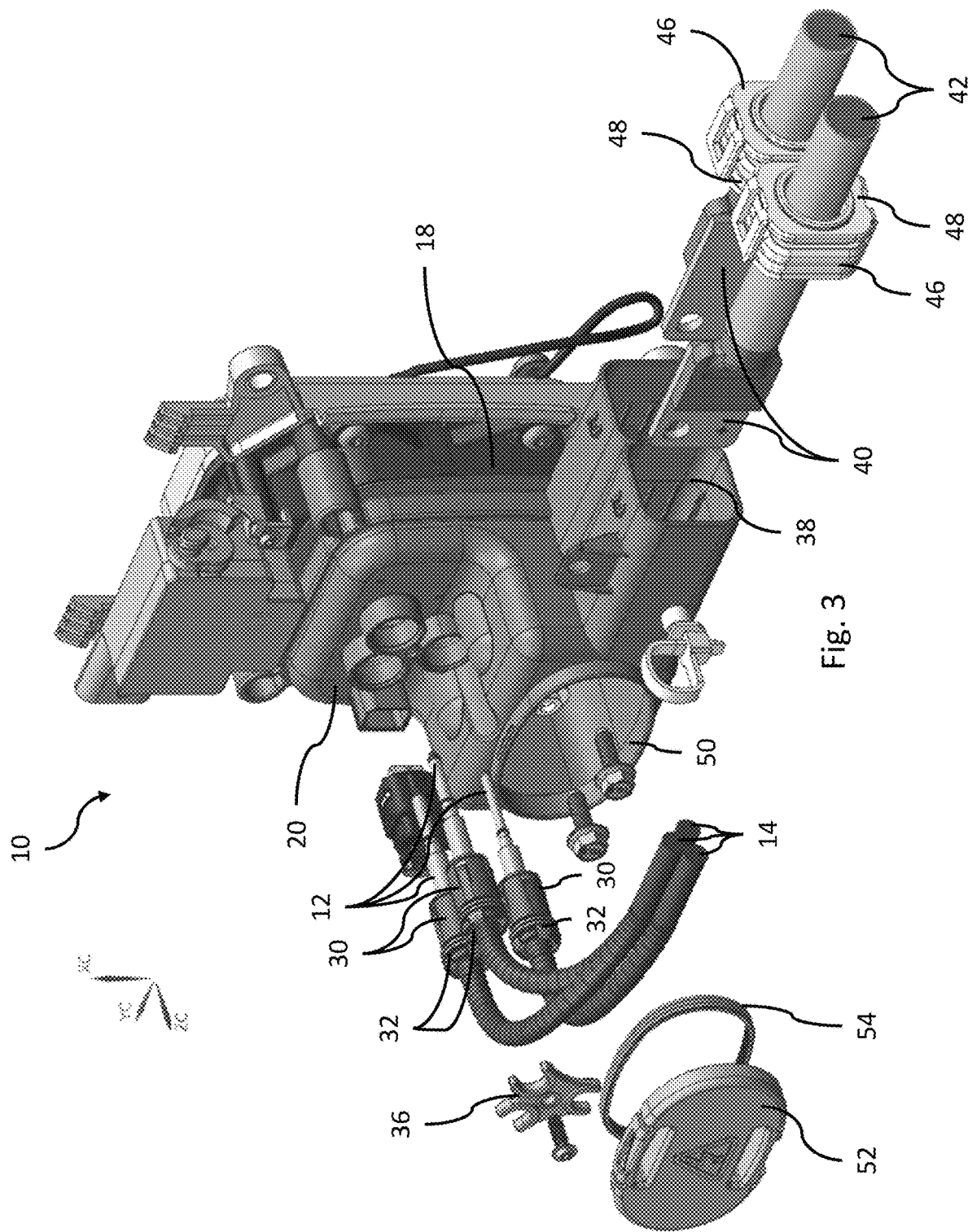
FIG. 3 is an exploded perspective view of the electric vehicle charging connector of FIG. 1 according to some embodiments.
Figure 4:
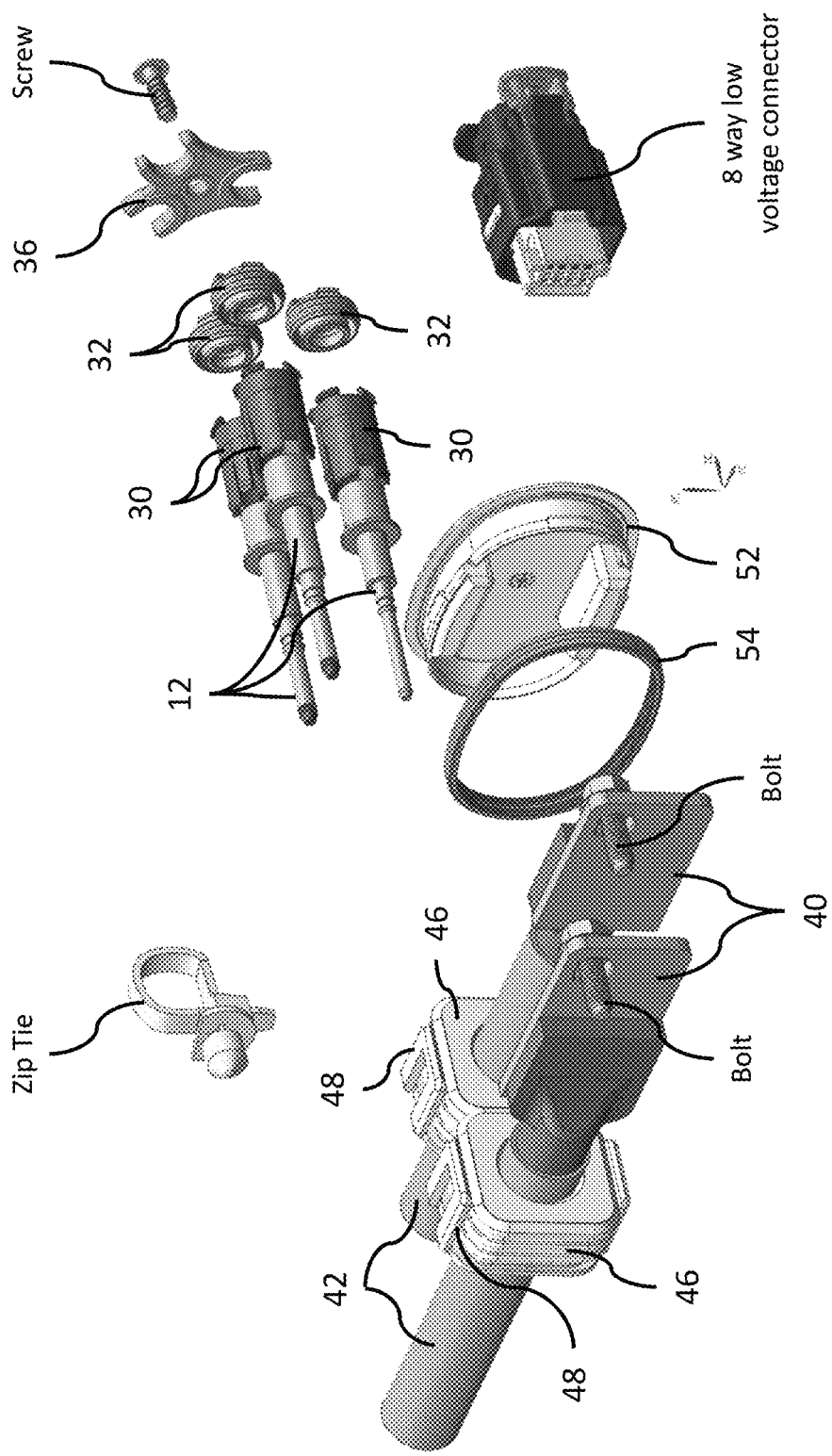
FIG. 4 is a partial exploded perspective view of the electric vehicle charging connector of FIG. 1 according to some embodiments.

The electrical connector 10 is designed to act as a "device" that allows the user to plug terminals 12, 40 and a connector directly through it, simplifying a harness assembly build process compared to the build process required to manufacture the electric vehicle charging connector shown in FIG. 1. This makes the electrical connector 10 a 'pluggable' solution. The AC terminals 12 plug directly through a preassembled device, i.e. the housing 18, PCB assembly 24 and terminal seal 28. All low voltage signals, e.g. thermistor and/or vehicle control signals, are routed through a connector header 26 on the PCB assembly 24, which allows for a low voltage connector to plug directly to the PCB assembly 24. The planar DC terminals 40 have a bolted connection with the cylindrical DC terminals 44. The AC terminals 12 and the planar DC terminals 40 can easily be detached from the electrical connector 10, allowing for the electrical connector 10 to be replaced without having to replace the wiring harness attached to the electrical connector 10, thereby reducing service and warranty costs. The design is also 'modular' which allows for the product to accommodate multiple cable dress orientations by changing only the cover 20 which has a minimal impact on overall design cost of the electrical connector 10.

The electrical connector 10 described herein provides the benefits of:

Simplifying the build process for manufacturing a wiring harness that includes the electrical connector 10 significantly by reducing the number of assembly operations by over 50% reduction.

Making the electrical connector 10 serviceable; AC and DC terminals 12, 40 may be removed from the electrical connector 10 and replaced.

Making the housing subassembly a "pluggable device" which allows for terminals/connectors to plugged into and through it.

Providing an electrical connector 10, 10', 10" that is modular and can be adapted for multiple cable dress orientations merely by changing the cover 20, 20', 20".

Eliminating the need for managing complex low voltage lead routing within the electrical connector 10.

Eliminating the need for matte seals which increase assembly process complexity and labor costs.

Meeting an ingress protection code rating of IP6K9K according to International Electrotechnical Commission Standard 60529.

Figure 22:
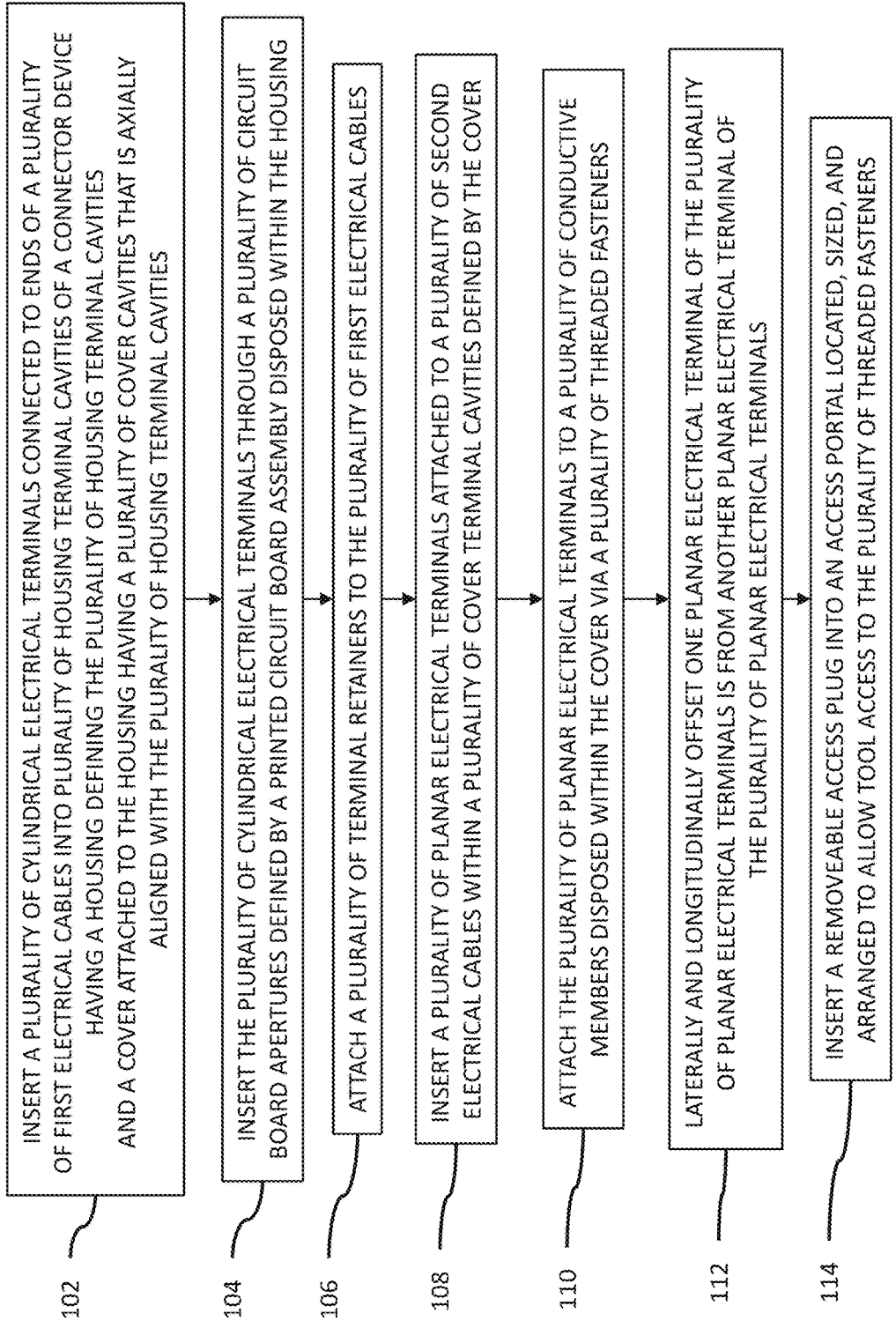
FIG. 22 is a flow chart of a method of assembling an electrical connector according to some embodiments.

An example of method 100 of assembling an electrical connector, such as an electric vehicle charging connector, is shown in FIG. 22. The method 100 contains the following steps:

STEP 102, INSERT A PLURALITY OF CYLINDRICAL ELECTRICAL TERMINALS CONNECTED TO ENDS OF A PLURALITY OF FIRST ELECTRICAL CABLES INTO PLURALITY OF HOUSING TERMINAL CAVITIES OF A CONNECTOR DEVICE HAVING A HOUSING DEFINING THE PLURALITY OF HOUSING TERMINAL CAVITIES AND A COVER ATTACHED TO THE HOUSING HAVING A PLURALITY OF COVER CAVITIES THAT IS AXIALLY ALIGNED WITH THE PLURALITY OF HOUSING TERMINAL CAVITIES, includes inserting a plurality of cylindrical electrical terminals 12 connected to ends of a plurality of first electrical cables 14 into a plurality of housing terminal cavities of a connector device 18, 20 having a housing 18 defining the plurality of housing terminal cavities 16 and a cover attached to the housing 18 having a plurality of cover cavities 22 that is axially aligned with the plurality of housing terminal cavities 16. The plurality of cover cavities 22 receives the plurality of cylindrical electrical terminals 14 as it is inserted within the plurality of housing terminal cavities 16 as shown in FIG. 6;

STEP 104, INSERT THE PLURALITY OF CYLINDRICAL ELECTRICAL TERMINALS THROUGH A PLURALITY OF CIRCUIT BOARD APERTURES DEFINED BY A PRINTED CIRCUIT BOARD ASSEMBLY DISPOSED WITHIN THE HOUSING, includes inserting the plurality of cylindrical electrical terminals 14 through a plurality of circuit board apertures defined by a printed circuit board assembly 24 disposed within the housing 18 as shown in FIG. 6.

Figure 5B:
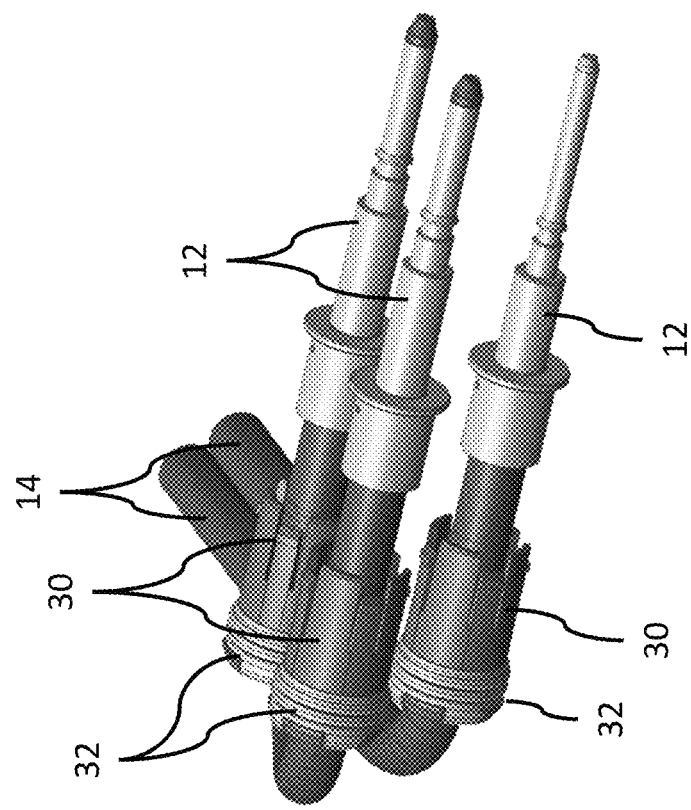
FIG. 5B is a perspective view of the cable retainers of FIG. 5B partially installed on electrical cables according to some embodiments.
Figure 5A:
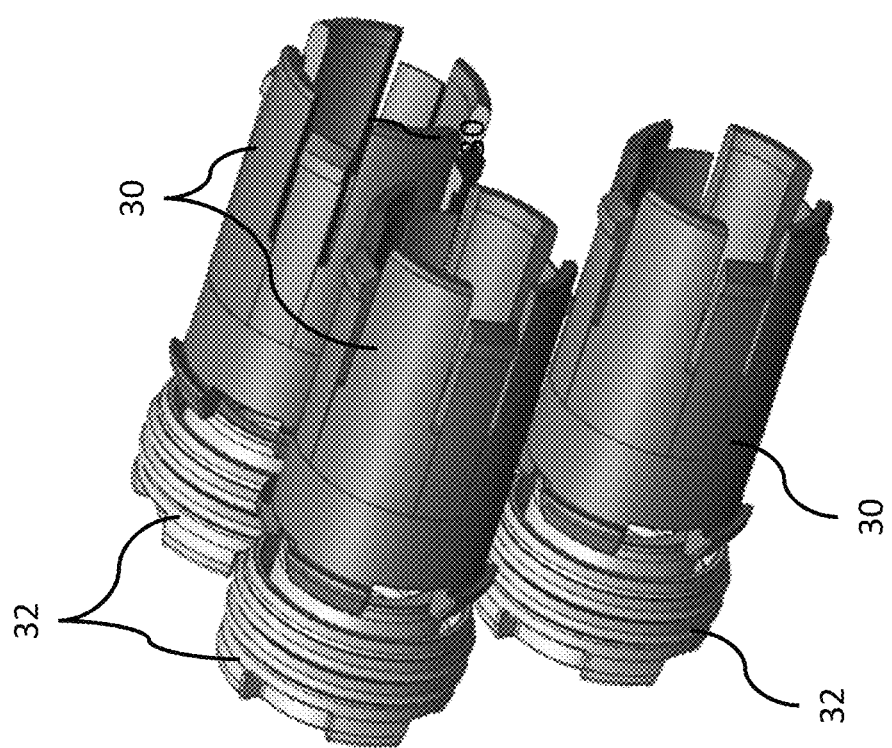
FIG. 5A is a perspective view of cable retainers of the electric vehicle charging connector of FIG. 1 according to some embodiments.
Figure 11:
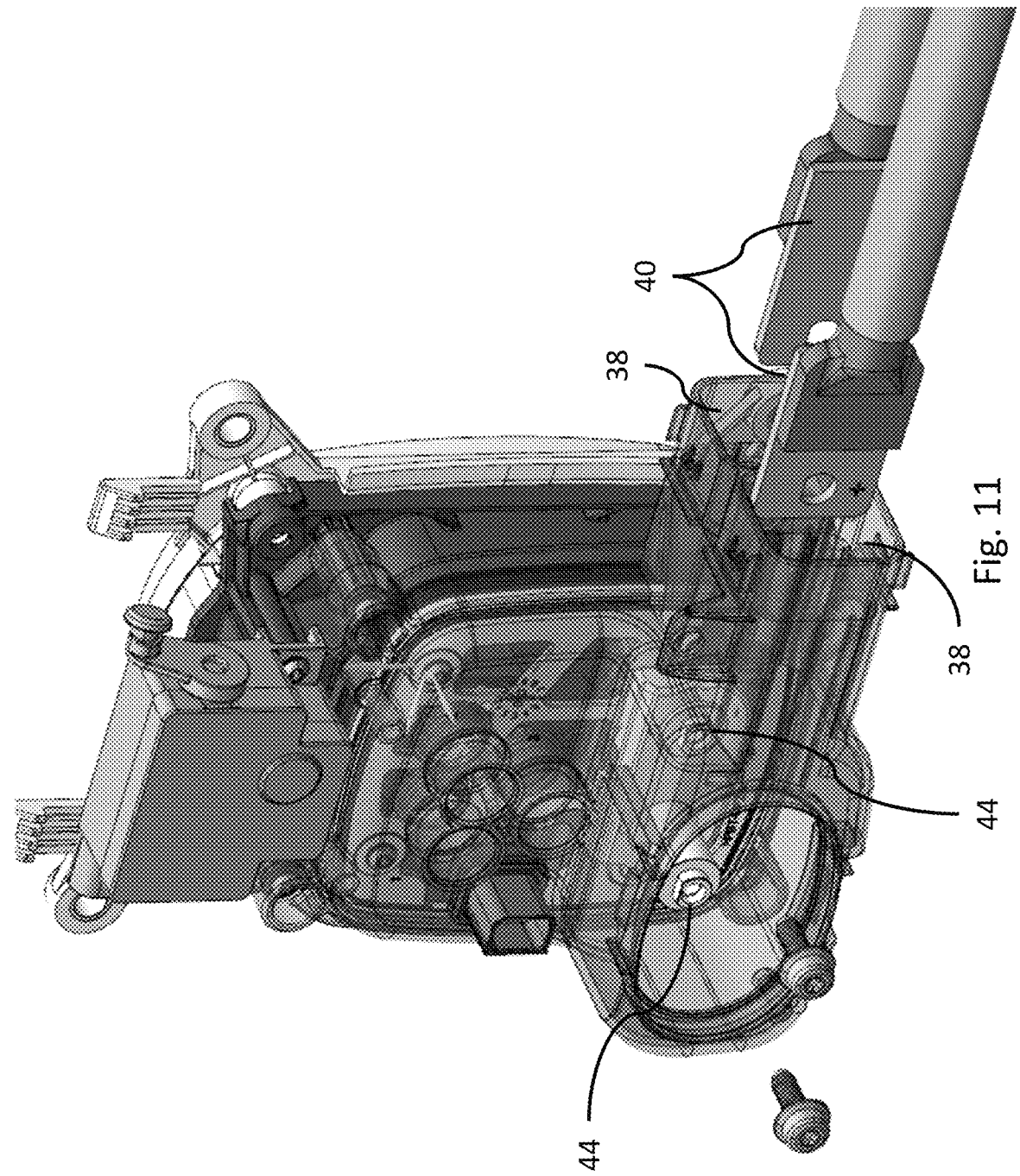
FIG. 11 is an X-ray exploded view of the electric vehicle charging connector of FIG. 10 according to some embodiments.

STEP 106, ATTACH A PLURALITY OF TERMINAL RETAINERS TO THE PLURALITY OF FIRST ELECTRICAL CABLES, includes attaching a plurality of terminal retainers 30 to the plurality of first electrical cables 14 as shown in FIG. 5B. The plurality of first electrical cables cooperates with the plurality of cover cavities to hold the plurality of cylindrical electrical terminals within the plurality of housing terminal cavities as shown in FIG. 7;

STEP 108, INSERT A PLURALITY OF PLANAR ELECTRICAL TERMINALS ATTACHED TO A PLURALITY OF SECOND ELECTRICAL CABLES WITHIN A PLURALITY OF COVER TERMINAL CAVITIES DEFINED BY THE COVER, includes inserting a plurality of planar electrical terminals 40 attached to a plurality of second electrical cables 42 within a plurality of cover terminal cavities 38 defined by the cover 20 as illustrated in FIGS. 10-12;

STEP 110, ATTACH THE PLURALITY OF PLANAR ELECTRICAL TERMINALS TO A PLURALITY OF CONDUCTIVE MEMBERS DISPOSED WITHIN THE COVER VIA A PLURALITY OF THREADED FASTENERS, includes attaching the plurality of planar electrical terminals 40 to a plurality of conductive members 44 disposed within the cover 20 via a plurality of threaded fasteners as shown in FIGS. 11 and 12;

STEP 112, LATERALLY AND LONGITUDINALLY OFFSET ONE PLANAR ELECTRICAL TERMINAL OF THE PLURALITY OF PLANAR ELECTRICAL TERMINALS IS FROM ANOTHER PLANAR ELECTRICAL TERMINAL OF THE PLURALITY OF PLANAR ELECTRICAL TERMINALS, includes laterally and longitudinally offsetting one planar electrical terminal 40 of the plurality of planar electrical terminals from another planar electrical terminal 40 of the plurality of planar electrical terminals as shown in FIG. 12; and STEP 114, INSERT A REMOVEABLE ACCESS PLUG INTO AN ACCESS PORTAL LOCATED, SIZED, AND ARRANGED TO ALLOW TOOL ACCESS TO THE PLURALITY OF THREADED FASTENERS, includes inserting a removeable access plug 52 into an access portal 50 defined by the cover 20. The access portal 50 is located, sized, and arranged to allow tool access to the plurality of threaded fasteners as shown in FIG. 10.

While the embodiment described herein is used as an electric vehicle charging connector, alternative embodiments of the electrical connector may be envisioned for use in other connection applications.

While the invention has been described with reference to an exemplary embodiment(s), it will be understood by those skilled in the art that various changes may be made and equivalents may be substituted for elements thereof without departing from the scope of the invention. In addition, many modifications may be made to adapt a situation or material to the teachings of the invention without departing from the essential scope thereof. Therefore, it is intended that the invention is not limited to the embodiment(s) disclosed, but that the invention will include all embodiments falling within the scope of the appended claims.

The invention claimed is:

1. An electrical connector, comprising:
    a plurality of cylindrical electrical terminals connected to ends of a plurality of first electrical cables;
    a housing defining a plurality of housing terminal cavities in which the plurality of cylindrical electrical terminals is disposed, wherein the housing includes a printed circuit board assembly defining a plurality of circuit board apertures through which the plurality of cylindrical electrical terminals extends; and
    a cover attached to the housing having a plurality of cover cavities that is axially aligned with the plurality of housing terminal cavities, the plurality of cover cavities configured to receive the plurality of cylindrical electrical terminals as it is inserted within the plurality of housing terminal cavities.

2. The electrical connector according to claim 1, further comprising a terminal seal configured to provide an environmental seal between the plurality of cylindrical electrical terminals and the cover, the terminal seal disposed between the housing and the cover.

3. The electrical connector according to claim 1, further comprising a plurality of terminal retainers surrounding the plurality of first electrical cables configured to cooperate with the plurality of cover cavities to hold the plurality of cylindrical electrical terminals within the plurality of housing terminal cavities.

4. The electrical connector according to claim 3, further comprising a plurality of first cable seals surrounding the plurality of first electrical cables configured to provide an environmental seal between the plurality of first electrical cables, the plurality of terminal retainers, and inner walls of the plurality of cover cavities.

5. The electrical connector according to claim 3, further comprising a yoke configured to separate the plurality of first electrical cables and configured to secure the plurality of terminal retainers within the plurality of cover cavities.

6. The electrical connector according to claim 1, wherein the cover defines a plurality of cover terminal cavities configured to receive a plurality of planar electrical terminals attached to a plurality of second electrical cables and wherein the plurality of planar electrical terminals is attached to a plurality of conductive members disposed within the cover via a plurality of threaded fasteners.

7. The electrical connector according to claim 6, wherein one planar electrical terminal of the plurality of planar electrical terminals is laterally and longitudinally offset from another planar electrical terminal of the plurality of planar electrical terminals.

8. The electrical connector according to claim 6, wherein the cover defines an access portal located, sized, and arranged to allow tool access to the plurality of threaded fasteners.

9. The electrical connector according to claim 8, further comprising a plurality of second cable seals surrounding the plurality of second electrical cables configured to provide an environmental seal between the plurality of second electrical cables and inner walls of the plurality of cover terminal cavities.

10. The electrical connector according to claim 9, further comprising a plurality of second cable retainers configured to hold the plurality of second cable seals within the plurality of cover terminal cavities.

11. The electrical connector according to claim 9, further comprising a removeable access plug configured to seal the access portal.

12. The electrical connector according to claim 6, wherein the cover may be configured to dress the plurality of first electrical cables and the plurality of second electrical cables in a rightward direction, in a leftward direction, or in a downward direction.

13. The electrical connector according to claim 1, wherein the printed circuit board assembly includes a connector header and wherein the connector header is sealed to the cover.

14. A method of assembling an electrical connector, comprising:
    inserting a plurality of cylindrical electrical terminals connected to ends of a plurality of first electrical cables into plurality of housing terminal cavities of a connector device having a housing defining the plurality of housing terminal cavities and a cover attached to the housing having a plurality of cover cavities that is axially aligned with the plurality of housing terminal cavities, wherein the plurality of cover cavities receive the plurality of cylindrical electrical terminals as it is inserted within the plurality of housing terminal cavities; and
    inserting the plurality of cylindrical electrical terminals through a plurality of circuit board apertures defined by a printed circuit board assembly disposed within the housing.

15. The method of claim 14, further comprising:
    attaching a plurality of terminal retainers to the plurality of first electrical cables, wherein the plurality of first electrical cables cooperates with the plurality of cover cavities to hold the plurality of cylindrical electrical terminals within the plurality of housing terminal cavities.

16. The method of claim 14, further comprising:

inserting a plurality of planar electrical terminals attached to a plurality of second electrical cables within a plurality of cover terminal cavities defined by the cover; and attaching plurality of planar electrical terminals to a plurality of conductive members disposed within the cover via a plurality of threaded fasteners.

17. The method of claim 16, further comprising:

laterally and longitudinally offsetting one planar electrical terminal of the plurality of planar electrical terminals from another planar electrical terminal of the plurality of planar electrical terminals.

18. The method of claim 17, further comprising:

inserting a removeable access plug into an access portal located, sized, and arranged to allow tool access to the plurality of threaded fasteners.

\* \* \* \* \*